(12) United States Patent
Kim

(10) Patent No.: US 6,215,768 B1
(45) Date of Patent: Apr. 10, 2001

(54) HIGH SPEED CONNECTION ADMISSION CONTROLLER BASED ON TRAFFIC MONITORING AND A METHOD THEREOF

(75) Inventor: Gyeong-Seok Kim, Kyonggi-do (KR)

(73) Assignee: Hyundai Electronics Industries Co. Ltd., Kyonggi-do (KR)

( * ) Notice: Subject to any disclaimer, the term of this patent is extended or adjusted under 35 U.S.C. 154(b) by 0 days.

(21) Appl. No.: 09/081,373

(22) Filed: May 19, 1998

(30) Foreign Application Priority Data

Jun. 30, 1997 (KR) .................................................. 97-29402
Jun. 30, 1997 (KR) .................................................. 97-29403

(51) Int. Cl.[7] .................................................... H04L 12/26
(52) U.S. Cl. .......................................... 370/230; 370/233
(58) Field of Search .................................... 370/230–234

(56) References Cited

U.S. PATENT DOCUMENTS 5,583,857 * 12/1996 Soumiya et al. ...................... 370/233
6,028,840 * 2/2000 Worster ................................. 370/230

OTHER PUBLICATIONS

Saito, H. 'Hybrid Connection Admission Control in ATM Networks', IEEE International Conference on Communications, SUPERCOMM/ICC Jun. 1992, vol. 2, pp. 699–703.*

* cited by examiner

Primary Examiner—Melvin Marcelo
(74) Attorney, Agent, or Firm—Reed Smith LLP

(57) ABSTRACT

A method for high speed connection admission control based on traffic monitoring includes the steps of comparing a peak cell rate of a call with a previous real available bandwidth which is updated, admitting or rejecting connection of the requested call by the comparison, computing a new available bandwidth as the call is connected and storing asynchronous transfer mode (ATM) cells, computing from the stored asynchronous transfer mode (ATM) cells a monitoring value for a traffic of the call by a certain time period, computing a probability distribution function for a cell number from the traffic monitoring value, computing an equivalent bandwidth according to the probability distribution function, and computing a real available bandwidth from a difference between the equivalent bandwidth and a physical link bandwidth and updating the available bandwidth, so that link may be efficiently used under real time control with a relatively simple hardware by performing the connection admission control (CAC) scheme based on the PCR and probability distribution function of a traffic, overload of exchange due to excessive introduction of traffics may be prevented in advance, and communication quality may be improved.

18 Claims, 5 Drawing Sheets

HIGH SPEED CONNECTION ADMISSION CONTROLLER BASED ON TRAFFIC MONITORING AND A METHOD THEREOF

BACKGROUND OF THE INVENTION

1. Field of the Invention

The present invention relates to a high speed connection admission controller based on traffic monitoring and a method thereof, in which connection admission control is carried out for a homogeneous traffic having equal cell loss factors and/or a heterogeneous traffic having different cell loss factors per classes by using a peak cell rate as a traffic parameter on the basis of traffic monitoring in a connection controller of an asynchronous transfer mode exchanger, so that it becomes possible to improve real time processing and to reduce error rate.

2. Description of Prior Art

In general, congestion of a computer communication network classification means occurs when a traffic is induced, the traffic having a capacity larger than that capable to be processed. Such a congestion occurs due to unexpected change of traffic flow or some trouble in the network.

Especially, in an ultra high speed communication network environment such as asynchronous transfer mode (ATM) having a very low error rate, cell loss due to overflow of buffer is the most typical reason of the error and the congestion in the ATM network may degrade fatally the service quality.

In order to minimize the bad influence of the congestion, various congestion control is performed, wherein a preventive congestion control scheme and a reactive congestion control scheme are adopted for the congestion control in the ATM network. The preventive congestion control scheme and the reactive congestion control scheme are applied at different time point. The preventive congestion control scheme is to control before possible traffic congestion by expecting traffic situation of a communication network, and reported appropriate for a high speed transfer protocol such as the ATM rather than the reactive congestion control scheme.

One of the most typical one of the protective congestion control scheme is connection admission control (CAC) scheme and the CAC scheme is an operation which is carried out by a communication network for control virtual channel connection (VCC) or virtual path connection (VPC) in the procedure of call connection.

The CAC scheme has an object to prevent degradation of service quality of previously connected calls and a traffic generated from a new call by determining connection of the new call when the new call is requested to be connected.

Therefore, the CAC scheme should be designed to be controlled in real time with a high link efficiency while keeping good service quality of traffics.

Further, the CAC scheme as described above is to control traffics when realizing an ATM of an exchange system which has been proposed for providing broadband-integrated service digital network (B-ISDN) service, so that the CAC scheme is installed in an exchange of a wire communication ATM as a control algorithm.

Recently, such a traffic control algorithm has been commercialized to be accommodated in the exchanges or the algorithm itself has been individually commercialized.

Among them, a CAC scheme based on computation of equivalent bandwidth and a CAC scheme based burst modelling are widespread.

According to the CAC scheme based on the equivalent bandwidth, when a new call is requested to be connected, the new call is determined to be connected in such a manner that after a bit rate generated in a multiplied connection is approximately modelled to obtain an equivalent bandwidth, the call is determined to be in excess of a remaining capacity or not.

The equivalent bandwidth means a minimum bandwidth satisfying a demand for service quality of a corresponding call and has a value which is larger than an average cell rate (ACR) and smaller than a peak cell rate (PCR).

The equivalent bandwidth is computed with a various method, in which a typical one performs the computation by using traffic characteristics regardless of a whole capacity of physical link to obtain equivalent bandwidths of each call so that an equivalent bandwidth for whole traffic is obtained on the basis of queuing analysis.

Referring to the below mentioned formula 1, an equivalent bandwidth of each cell having a cell loss rate demand threshold value is obtained by formula 1:

$$c = \frac{ab(1-\rho)R_P - x + \sqrt{[x - ab(1-\rho)R_P]^2 + 4x\rho ab(1-\rho)R_P}}{2\rho b(1-\rho)} \quad (1)$$

wherein, $\alpha = -\ln \epsilon$, $R_F = PCR$, $\rho = ACR:PCR$, $b =$ an average burst length, and $x =$ buffer size.

In this case, a size $\hat{C}$ of a whole bandwidth demanded when n connections are multiplied is obtained by the below formula 2:

$$C = \sum_{i=1}^{n} c_i \quad (2)$$

wherein, if it is estimated that Gaussian distribution is performed for aggregated traffics in view of efficiency of multiplication, a size of a whole bandwidth $\hat{c}$ is obtained by formula 3:

$$\hat{C} = \min\left\{m + a'\sigma, \sum_{i=1}^{n} c_i\right\} \quad (3)$$

$$a' = \sqrt{-2\ln(\varepsilon) - 2\ln(2\pi)_0}$$

$$m = \sum_{i=1}^{n} M_i, \sigma^2 = \sum_{i=1}^{n} \sigma_i^2$$

wherein, $m_i$ represents an average bit rate, and $\sigma_i^2$ represents a distribution.

The CAC scheme based on the burst modelling determines to connect or not the new call by using a peak bit rate (PBR) and an average bit rate (ABR), regardless of distribution of on/off intervals of a cell arrive processor.

When n virtual channel, in which PBR=R and ABR=$\alpha$, are multiplied, a probability that a number of burst in an on-state is to be k at any time point is obtained by formula 4:

$$P(n,k) = {}_nC_k \left(\frac{a}{R}\right)^k \left(1 - \frac{a}{R}\right)^{n-k} \quad (4)$$

As above, it is estimated that a probability $P(n,k)$ that a size of a bandwidth demanded when k virtual channel is multiplied in the link is kR.

In this case, if a determination for connection admission of the new call excesses a threshold availability of bandwidth which is being used by already connected calls, the connection admission of the new call is determined by formula 5:

$$\sum_{\frac{kR}{C}<0.90} P(n,k) < 1-\varepsilon \qquad (5)$$

When a physical link bandwidth is C and the number of a whole connected calls including the new call is n, if a probability that a size of the whole bandwidth to be used by the calls including the new call after the new call is connected does not exceed 90% of the physical link bandwidth is reasonable, that is, if the probability is smaller than $(1-\varepsilon)$, the connection of the new call is admitted.

However, the CAC scheme based on the conventional equivalent bandwidth computation has disadvantages that it is difficult to compute a precise equivalent bandwidth in advance, link using efficiency is noticeably reduced in case of a small traffic source number, and real time control is difficult to be realized due to the time period required for and precision of the whole equivalent bandwidth computation.

Furthermore, even though the CAC scheme based on the burst modelling is convenient rather than the CAC scheme based on the equivalent bandwidth, it has still disadvantages that the computation becomes complicated under the heterogeneous traffic environment and relationship between the burst traffic characteristics and the service quality is unclear.

SUMMARY OF THE INVENTION

The present invention is derived to resolve the problems of the prior art and has an object to provide a high speed connection admission controller based on traffic monitoring and a method thereof, by which efficient link use is possible for any traffic sources while real time control, especially degradation of the link use is prevented even in case of a small number of traffic source, and computation under a heterogeneous traffic environment is simplified, by using a CAC scheme based on PCR and probability distribution functions.

It is another object of the present invention to provide a high speed connection admission controller based on traffic monitoring and a method thereof, by which the real time control is improved by using only the PCR as a parameter of the traffic source.

It is a further object of the present invention to provide a high speed connection admission controller based on traffic monitoring and a method thereof, by which a structure of an exchange is simplified comparing to the conventional CAC scheme based on the equivalent bandwidth computation, the real time control is improved by rapid comparative determination, and the link use efficiency is increased by reducing an error rate of a controller comparing to the conventional CAC scheme based on the burst modelling.

It is still another object of the present invention to provide a high speed connection admission controller based on traffic monitoring and a method thereof, by which overload of an ATM exchange is prevented by preventing excessive introduction of traffic in advance.

It is a still further object of the present invention to provide a high speed connection admission controller based on traffic monitoring and a method thereof, by which communication quality is improved by reducing control time for introduction of calls.

According to the present invention, a method for high speed connection admission control based on traffic monitoring includes the steps of admitting connection of a requested call having a PCR when an available bandwidth is larger than the PCR of the call, computing a new available bandwidth by deducting the PCR from the previous available bandwidth, computing a monitoring value for a traffic of the admitted call as it is connected, computing an equivalent bandwidth of a probability distribution function for a cell number from the traffic monitoring value according to the probability distribution function, and computing a real available bandwidth from a difference between the equivalent bandwidth and a physical link bandwidth and updating the available bandwidth, so that the CAC is continuously performed for next calls.

The high speed connection admission controller and a method thereof according to the present invention are performed by using the PCR as a traffic parameter provided by users on the basis of traffic monitoring. It is because that, in case of the ACR, it is impossible for a certain traffic to precisely estimate the ACR by traffic sources, so that the ACR is not appropriate as the traffic parameter. However, if the CAC is performed only based on the PCR except the ACR, information as to the traffic is lack.

Therefore, according to the present invention, it is computed, through a real estimation of traffic, a probability distribution function for the number of calls which are arrived for a certain estimation period, and the equivalent bandwidth which is used by a current traffic is computed from the probability distribution function.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Now, a high speed connection admission controller based on traffic monitoring and a method thereof according to the present invention will be described in more detail with reference to attached drawings.

Figure 1:
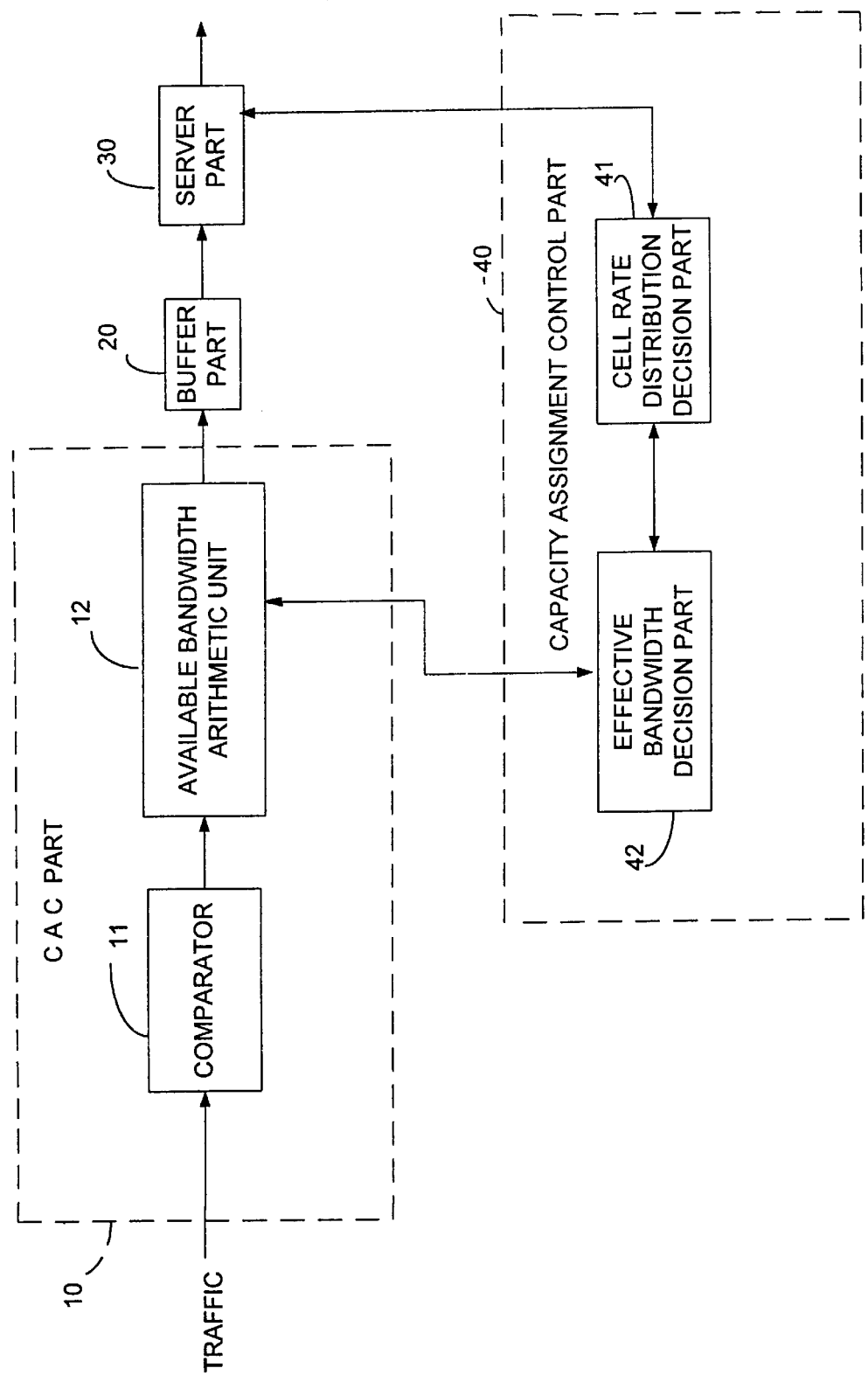
FIG. 1 is a schematic block diagram of a high speed connection admission controller based on traffic monitoring according to a preferred embodiment of the present invention.

FIG. 1 is a schematic block diagram of the high speed connection admission controller based on traffic monitoring according to a preferred embodiment of the present invention.

In FIG. 1, the high speed connection admission controller based on traffic monitoring includes a CAC part 10 for comparing a PCR with an available bandwidth to determine its connection admission, and for computing a new available bandwidth when a call having a PCR of a homogeneous traffic is requested to be connected, a buffer part 20 for storing ATM calls which are introduced with a certain time period via the CAC part 10 when the call is admitted to be connected, a server part 30 for computing a traffic monitoring value which is output from the server part 30, and a capacity assignment control part 40 for computing a probability distribution function for a cell number from the traffic monitoring value which is output from the server part 30, for computing an equivalent bandwidth according to the probability distribution function, and for computing a real available bandwidth from a difference between the equivalent bandwidth and a physical link bandwidth to output it to the CAC part 10.

The CAC part 10 includes a comparator 11 for comparing the PCR of the call which is requested to be connected with a size of the available bandwidth which is a feedback output from the capacity assignment control part 40, and an available bandwidth arithmetic unit 12 for admitting the requested call to be connected if the available bandwidth is determined to be larger than the PCR of the call by the comparator 11 and for computing a new available bandwidth by deducting the PCR from the previous available bandwidth after the requested call is connected.

The buffer part 30 for performing the traffic monitoring includes a cell counter register (unshown) for counting ATM cell number and a cell error counter register (unshown) for counting erroneous ATM cell number.

The capacity assignment control part 40 includes a cell rate distribution decision part 41 for computing a probability distribution function for a cell number from the traffic monitoring value output from the server part 30, a used available bandwidth decision part 42 for computing an equivalent bandwidth according to the probability distribution function obtained by the cell rate distribution decision part 41 and computing a real available bandwidth from a difference between the equivalent bandwidth and a physical bandwidth to feedback output it to the available bandwidth arithmetic unit 12 in the CAC part 10.

Figure 2:
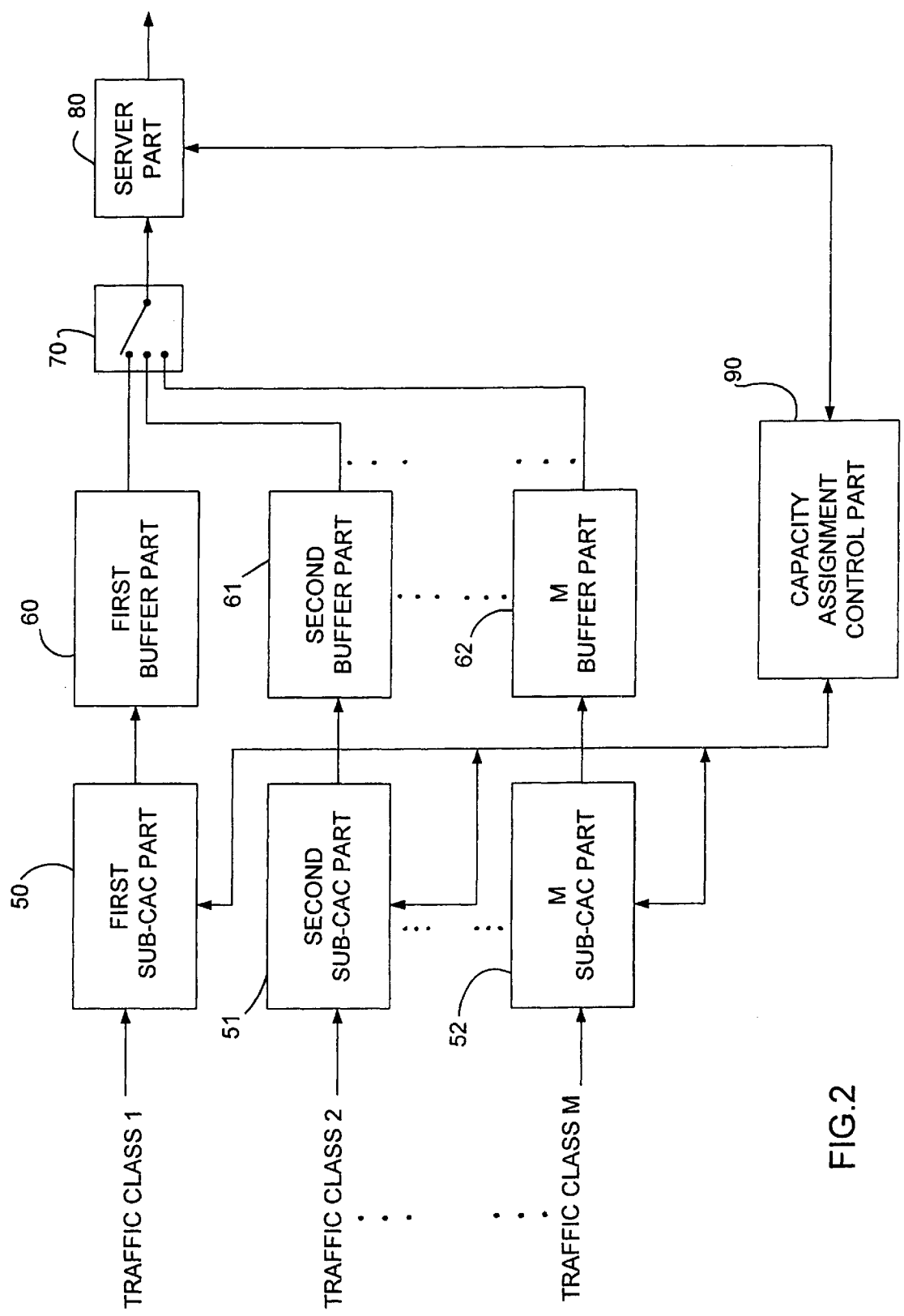
FIG. 2 is a schematic block diagram of a high speed connection admission controller based on traffic monitoring according to another preferred embodiment of the present invention.

FIG. 2 is a schematic block diagram of a high speed connection admission controller based on traffic monitoring according to another preferred embodiment of the present invention, which shows a structure of a parallel CAC apparatus for performing CAC of a traffic having heterogeneous classes characteristics in case that traffic sources introduced for the CAC cover a plurality of classes (for example, M classes).

The parallel CAC apparatus includes first to m sub-CAC parts 50–52 for determining connection of a new call after comparing a PCR of the call with a previous available bandwidth when the new call is requested to be connected and for computing a new available bandwidth when the new call is admitted to be connected, first to m buffer parts 60–62 for storing ATM cells which are introduced via the first to m sub-CAC parts 50–52 by a certain time period when the new call is admitted to be connected, a switching part 70 for selecting ATM cells stored in the first to m buffer parts 60–62 according to Round Robin system to output them, a server part 80 for computing a monitoring value for an ATM cell traffic corresponding to respective classes which are selected by the switching part 70, and a capacity assignment control part 90 for computing a cell probability distribution function per cells from the traffic monitoring values output from the server part 80, for computing equivalent bandwidths for each class according to the probability distribution functions and computing a real available bandwidth from a difference between the equivalent bandwidths and physical link band width to feedback output the real available bandwidth to the first to m sub-CAC parts 50–52.

The first to m sub-CAC parts 50–52 respectively have the same structure with the CAC part 10 of FIG. 1, the server part 80 also includes a cell counter register and a cell error counter register, and the capacity assignment control part 90 has also the same structure with the capacity assignment control part 40 of FIG. 1.

Figure 3:
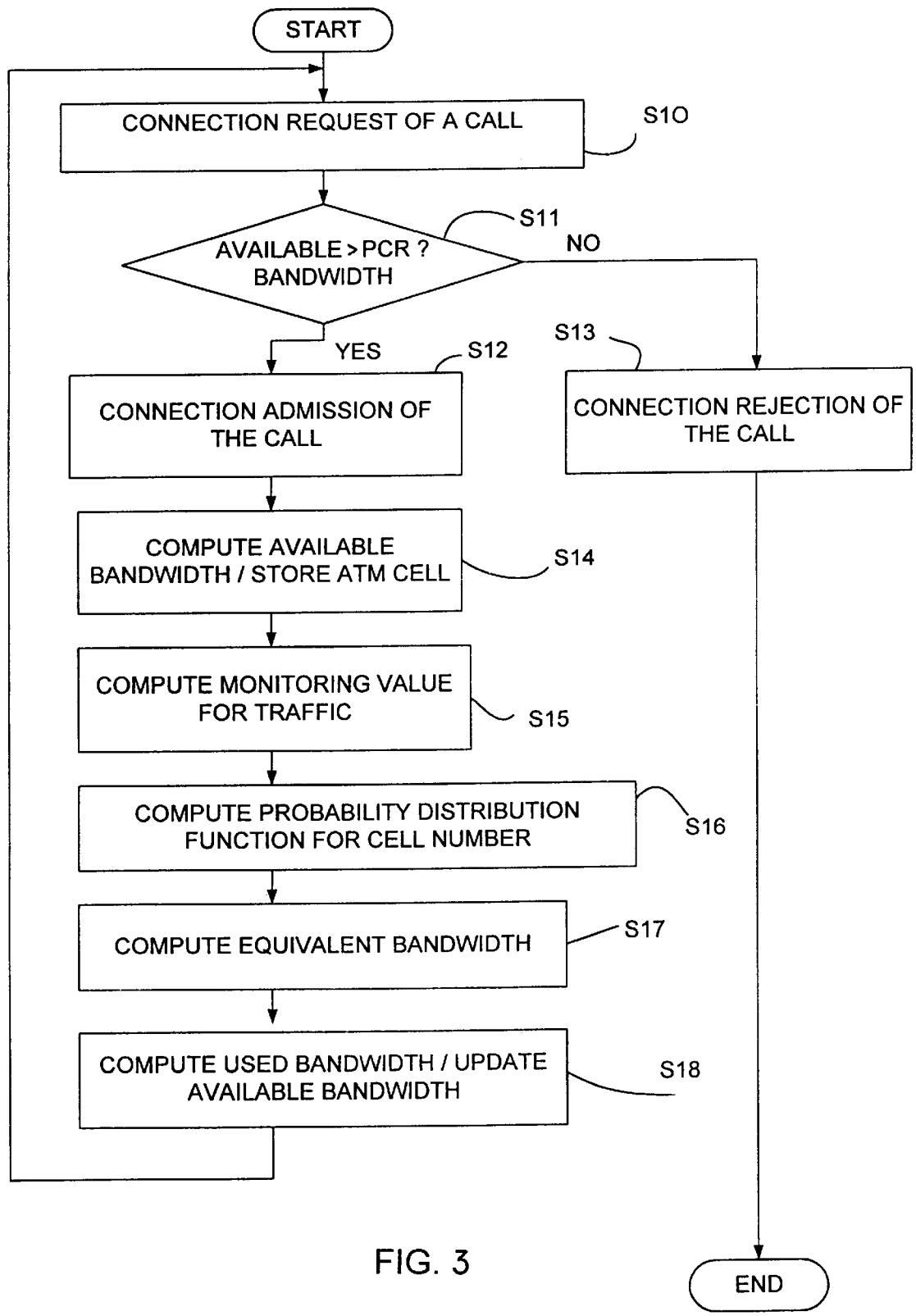
FIG. 3 is a flow chart for explaining a control method for a high speed connection admission based on traffic monitoring according to a preferred embodiment of the present invention.
Figure 4:
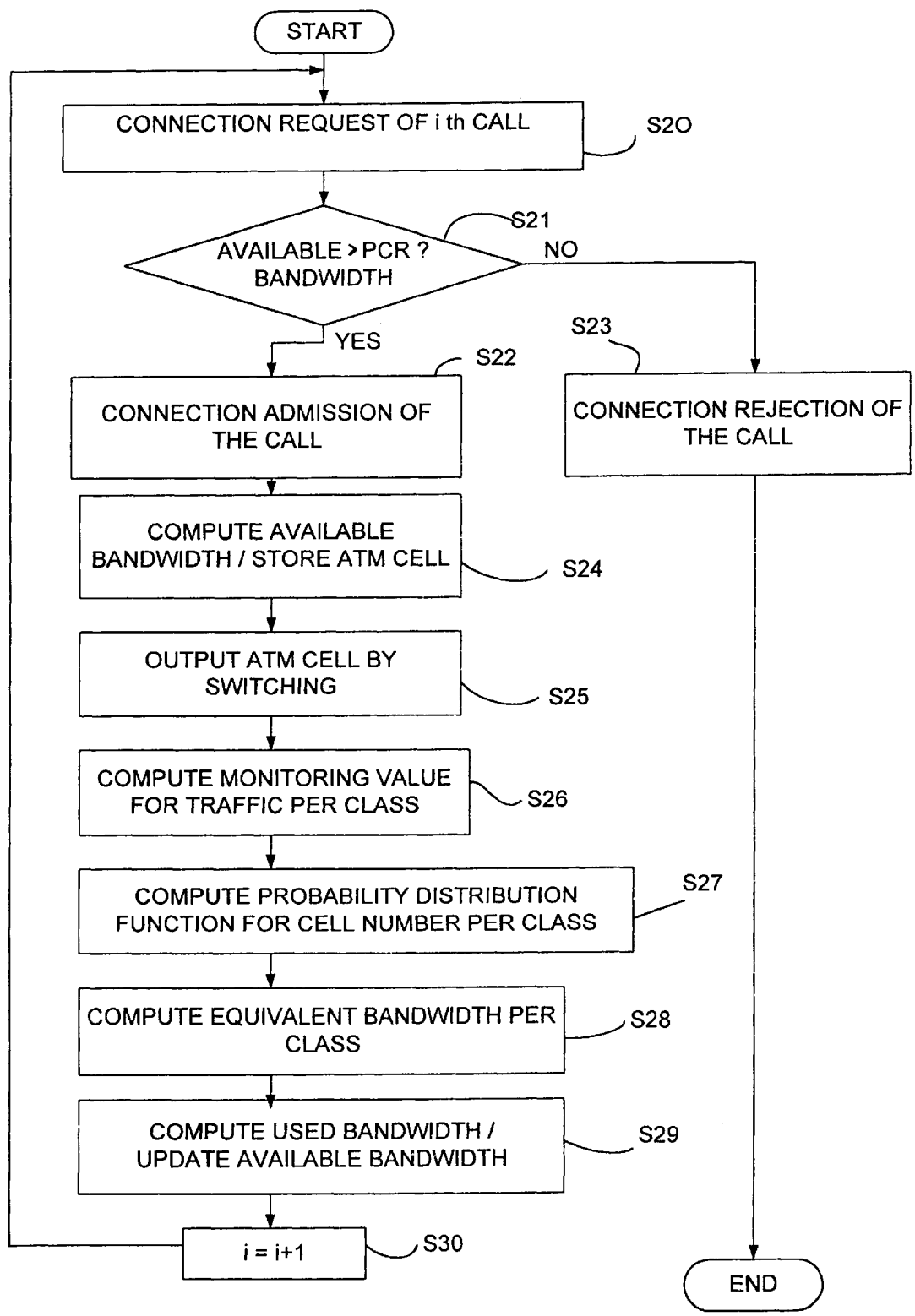
FIG. 4 is a flow chart for explaining a control method for a high speed connection admission controller based on traffic monitoring according to another preferred embodiment of the present invention.

Now, operations of the high speed connection admission controller based on traffic monitoring according to preferred embodiments of the present invention, with reference to FIG. 3 and FIG. 4.

First, operations of the high speed connection admission controller based on traffic monitoring as shown in FIG. 1 will be described hereinafter, with reference to FIG. 3.

In FIG. 3, when a call having a PCR is requested to be connected in the CAC part 10 (step S10), the comparator 11 of the CAC part 10 compares the PCR of the requested call with a previous real available bandwidth which is output from the used available bandwidth decision part 42 in the capacity assignment control part 40 and then updated in order to determine whether or not to connect the requested call (step S11).

According to the result of the comparison in the step S11, the requested call is admitted to be connected if the available bandwidth is decided to be larger than the PCR of the call (step S12), while the requested call is rejected to be connected and the CAC is finished if the available bandwidth is decided to be smaller than the PCR of the call (step S13).

If the call is admitted to be connected in step S12, the arithmetic unit 12 in the CAC part 10 computes a new available bandwidth by deducting the PCR from the previous available bandwidth and the buffer part 20 stores ATM cells introduced via the CAC part 10 as the connection admission of the call (step S14).

Next, the server part 30 counts whole cell number and erroneous cell number of a traffic corresponding to the stored ATM cells by a certain time period and record the numbers respectively to the cell counter register and the cell error counter register, so that monitoring values for all traffics are obtained and output to the cell rate distribution decision part 41 in the capacity assignment control part 40 (step S15).

The cell rate distribution decision part 41 computes a probability distribution function for cell number on the basis of traffic monitoring values, which are provided by the server part 30, and outputs the probability distribution function to the used available bandwidth decision part 42 in the capacity assignment control part 40 (step S16).

Therefore, a size of the computed real available bandwidth is decided by deducting the equivalent bandwidth from the available physical link bandwidth.

Then, the available bandwidth arithmetic unit 12 updates the computed new available bandwidth in step S14 as a real available bandwidth which is output from the used available bandwidth decision part 42 (step S18).

Now, referring to FIG. 4, operations of the high speed connection admission controller based on traffic monitoring as shown in FIG. 2 will be described in more detail.

When an ith call having a PCR as the traffic parameter is requested to be connected to the first to m sub-CAC parts 50–52 (step S20), the comparators 11 in the first to m sub-CAC parts 50–52 compare the PCR with a size of the previous real available bandwidth which is updated from the feedback output from the used available bandwidth decision part 32 in the capacity assignment control part 80 and decide whether or not to admit its connection (step S21).

As a result of the comparison in the step S21, the call is admitted to be connected if the available bandwidth is larger than the PCR, while the call is rejected to be connected if the available bandwidth is not larger than the PCR (step S23).

If the connection of the call is admitted in the step S22, the available bandwidth arithmetic units 12 in the first to m sub-CAC parts 50–52 compute a new available bandwidth by deducting the PCR from the previous available bandwidth, and the first to m buffer parts 60–62 store ATM cells which are introduced via the first to m sub-CAC parts 50–52 according to the connection admission by the first to m buffer parts 60–62 in step S22 (step S23).

After the ATM cells are stored in the first to m buffer parts 60–62 as the connection admission is obtained for the respective calls corresponding to m classes, the switching part 70 outputs the stored ATM cells to the server part 80 by the switching operation according to the Round Robin system (step S25).

The server part 80 counts numbers of the ATM cells stored in the first to m buffer parts 60–62 by a certain time period, that is, total cell numbers and erroneous cell numbers for the traffic per classes. The counted numbers are respectively recorded to the cell counter register and the cell error counter register to obtain the monitoring values per traffic classes and output the monitoring values to the used available bandwidth decision part 42 in the capacity assignment control part 90 (Step S27).

Therefore, the used available bandwidth decision part 42 computes equivalent bandwidths for respective classes on the basis of the probability distribution function obtained by the cell rate distribution decision part 41 (step S28). Differences between the equivalent bandwidths and the physical link bandwidth is computed to obtain a real available total bandwidth and this available total bandwidth is feedback output to the available bandwidth arithmetic unit 12 in the first to m sub-CAC part 50–52.

At this time, a size of the computed real available total bandwidth is decided by deducting a sum of the equivalent bandwidths of each class from a total link bandwidth.

Then, the available bandwidth arithmetic unit 12 updates the real available total bandwidth in the used available bandwidth decision part 42 with the new available bandwidth which is computed by the available bandwidth arithmetic unit 12 in step S24 (step S29).

After that, connection request of calls in next classes is dealt with through the same routine as above (S30).

On the other hand, the capacity assignment control part 90 decides class capacities which are defined by service capacity for each class, that is, the equivalent bandwidths of each traffic class for the sum of the bandwidths of total traffic classes, and controls scheduling of the server part 80 so that the ATM cells stored in the first to m buffer parts 60–62 are transferred to physical channels by the Round Robin system.

Figure 5:
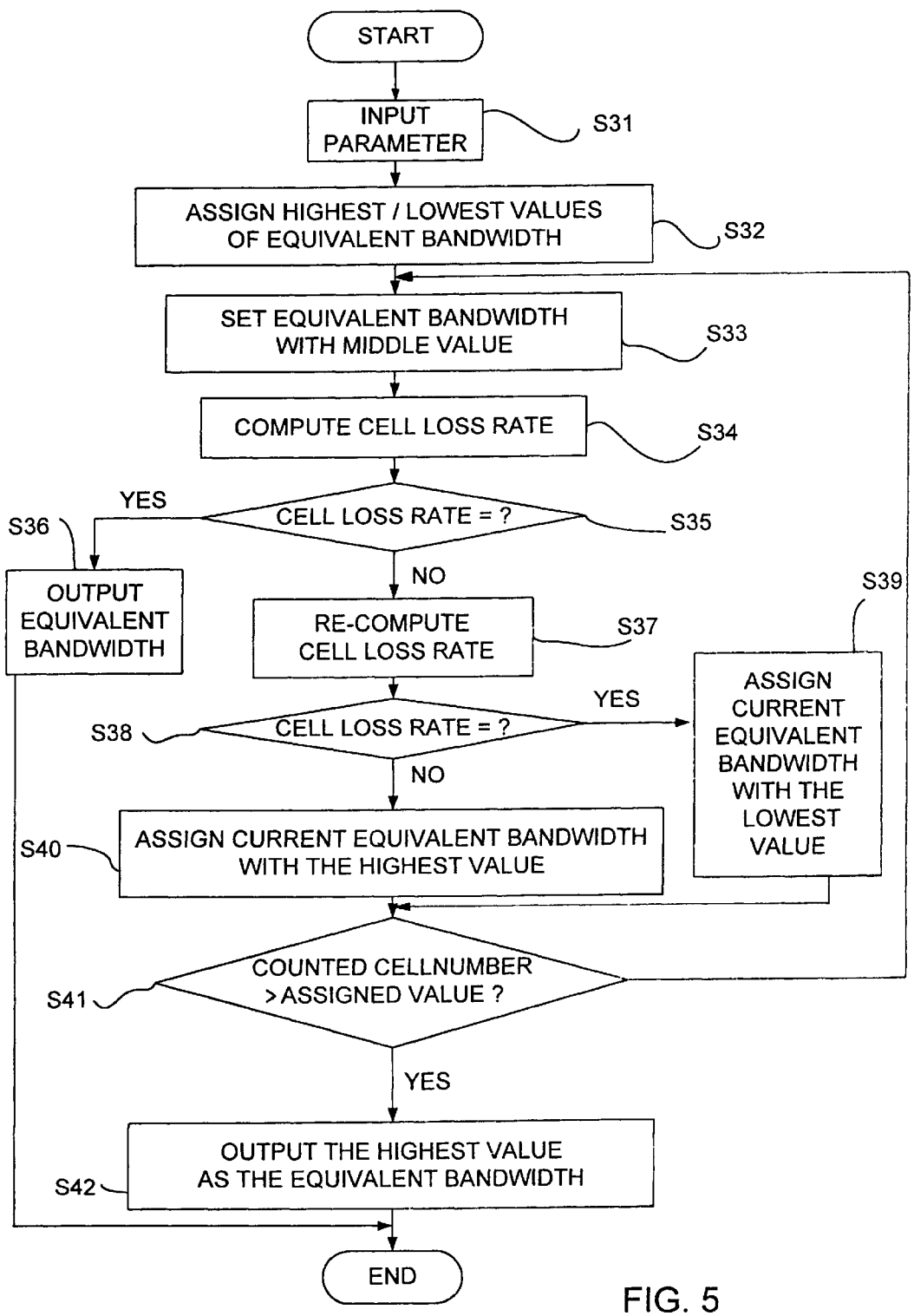
FIG. 5 is a flow chart for explaining computing equivalent bandwidth in an exchange of an asynchronous transfer mode.

Now, referring to FIG. 5, the equivalent bandwidth computation steps S17 and S28, which are commonly carried out by the both embodiments of the present invention which are respectively shown in FIG. 3 and FIG. 4, will be described in more detail.

In order to compute an equivalent bandwidth, a probability distribution function should be estimated, wherein a parameter for measuring the probability distribution function, that is, an important parameter for measuring a traffic which is multiplied to a link is as follows:

1) Renewal Period; one renewal period is composed n measuring periods, so that after nth measuring the renewal is carried out. If the renewal period is long, dynamic adaptation to changes of traffic decreases while time delay influence upon computing a used bandwidth decreases.

On the other hand, if the renewal period is short, the dynamic adaptation to changes of the traffic becomes fast while the precision of the probability distribution is lowered, since a number of samples decreases.

2) measurement reflection ratio a; it means a weighted value to decide how much the real measurement value is to be reflected to the previous probability distribution function.

In the estimation of the probability distribution function by the parameters as above, if a probability that k cells are arrived during a measuring time period (s) in nth renewal period of ith class is $p^{(i)}n(k^{(i)};n)$, the estimation value $\hat{p}^{(i)}(k^{(i)};n)$ of the probability distribution function represents by formula 6;

$$\hat{p}^{(i)}(k^{(i)};n+1) = \alpha q^{(i)}(k^{(i)};n) + (1-\alpha)\hat{p}(k^{(i)};n) \quad (6)$$

Referring to the below formula 7, R represents a number of peak cells number which may arrive in the measuring time period, and formula 8 represents an estimation of a probability distribution function when a call having a PCR $R_F$ is admitted to be connected.

$$R = s \cdot R_p^{(i)} \quad (7)$$

$$\hat{p}^{(i)}(k^{(i)};n+1) = \begin{cases} \hat{p}^{(i)}(k^{(i)} - R;n), & k^{(i)} \geq R \\ 0 & k^{(i)} < R \end{cases} \quad (8)$$

In the meantime, if a call which is already multiplied to a link is released, no action is taken on behalf of simplification of control. At this time, even though bandwidth is wasted for a moment, a real bandwidth is computed by real measurement in a short time.

If a probability distribution function for the number of cells which arrive in the measurement time period (s) is given, a cell loss rate in the nth renewal period of ith class is obtained by formula 9;

$$P_{loss}^{(i)}(n) = \frac{\sum_{k=0}^{\infty} \left[ k^{(i)} - \frac{sC'}{L} \right]^+ \hat{p}^{(i)}(k^{(i)};n)}{\sum_{k=0}^{\infty} k^{(i)} p^{(i)}(k^{(i)};n)} \quad (9)$$

$$\text{wherein, } [x]^+ = \begin{cases} x, & x \geq 0 \\ 0, & x < 0 \end{cases}$$

If a service demand threshold value for a user's cell loss rate for a traffic of ith class is defined $\epsilon^{(i)}$, and an estimation value of a probability that number of cells of the traffic of the ith class which may arrive in the measurement time period (s) is $\hat{p}^{(i)}(k^{(i)};n+1)$, an equivalent bandwidth ($C'^{(i)}$) which is in use by the traffic of the ith class is computed.

The computing procedure of the equivalent bandwidth for the ith class is explained in more detail with reference to FIG. 5.

First, parameters ($P^{(i)}$, $A^{(i)}$) required for computation of the equivalent bandwidth for the traffic of the ith class are input (step S31), wherein the parameter $P^{(i)}$ represents a peak cell rate PCR for the traffic of the ith class and the other parameter $A^{(i)}$ represents an average cell rate ACR for the traffic of the ith class.

In case of variable bit rate (VBR) service, since an equivalent bandwidth is decided between an ACR and a PCR, a highest value $P^{(i)}$ is initialized to be $b^{(i)}$ and a lowest value $A^{(i)}$ is initialized to be $a^{(i)}$ (step S32).

After that, a middle value between the highest value $b^{(i)}$ and the lowest value $a^{(i)}$ is computed and set as the equivalent bandwidth $C^{(i)}$ (step S33).

Then, a loss rate $(P_{loss}^{(i)}(n))$ for the traffic of the ith class in the corresponding renewal period is computed (step S34).

The cell loss rate $(P_{loss}^{(i)}(n))$ which is computed in step S34 is compared with the service demand threshold value $\epsilon^{(i)}$ (step S35).

According to the result of the comparison, if the cell loss rate $(P_{loss}^{(i)}(n))$ is equal to the service demand threshold value $\epsilon^{(i)}$, it means that the equivalent bandwidth obtained in step S33 is to be a critical value. Therefore, the equivalent bandwidth $C^{(i)}$ is output finishing the whole procedure.

On the other hand, if the cell loss rate is not equal to the service demand threshold value $\epsilon^{(i)}$, the cell loss rate $(P_{loss}^{(i)}(n))$ is computed again adding next cell.

The cell loss rate $(P_{loss}^{(i)}(n))$ which is recomputed in step S37 is compared with the service demand threshold value $\epsilon^{(i)}$ (step S38).

According to the result of the comparison, if the cell loss rate is larger than the service demand threshold value $\epsilon^{(i)}$, it means that a currently assigned equivalent bandwidth is underestimated with relation to a real traffic. Therefore, the current equivalent bandwidth is assigned to the lowest value $a^{(i)}$ (step S39). On the other hand, if the cell loss rate is smaller than the service demand threshold value $\epsilon^{(i)}$, it means that the currently assigned equivalent bandwidth is overestimated with relation to the real traffic. Therefore, the current equivalent bandwidth is assigned to the highest value $b^{(i)}$ (step S40).

After that, a number of cells which are counted until now is compared with an assigned value N (step S41), and a routine after step 32 is performed repeatedly if the counted cell number is smaller than the assigned value N, while the highest value $b^{(i)}$ is output as the equivalent bandwidth finishing the routine if the counted cell number is larger than the assigned value N since one renewal period is deemed to be finished and the currently assigned highest value $b^{(i)}$ corresponds to the equivalent bandwidth.

As described hereinabove, according to the present invention, the CAC scheme is performed by a renewal period which is given a bandwidth being in use by a currently connected traffic when nth renewal period is started, a bandwidth which is able to be used by users, and a renewal period having a probability distribution function for a cell number.

Effect of the Invention

According to the present invention as described hereinabove, efficient link use becomes possible both for homogeneous and heterogeneous traffic sources while keeping real time control with a relatively simple hardware by using the connection admission control (CAC) scheme based on PCRs and probability distribution functions of a traffic, overload of exchange may be prevented in advance by preventing excessive introduction of traffics, and communication quality may be improved by reducing control time for introducing calls with a simple comparison procedure.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A high speed connection admission controller based on traffic monitoring comprising:

connection admission control (CAC) means for determining whether or not to connect a new call after comparing a peak cell rate (PCR) of the call with a previous available bandwidth when the call having the peak cell rate (PCR) of homogeneous traffic is requested to be connected, and for computing a new available bandwidth when the new call is admitted to be connected;

buffer means for storing asynchronous transfer mode (ATM) cells which are introduced via the connection admission control (CAC) means by a certain time period when the call is admitted to be connected;

server means for computing a traffic monitoring value which is output from the buffer means; and capacity assignment control means for computing a probability distribution function for a cell number from the traffic monitoring value which is output from the server means, and for computing a real equivalent bandwidth according to the probability distribution function, to feedback output the real equivalent bandwidth to the connection admission control (CAC) means.

2. The high speed connection admission controller based on traffic monitoring according to claim 1, wherein the connection admission control (CAC) means comprises:

a comparator for comparing the peak cell rate (PCR) of the call which is requested to be connected with a size of the real available bandwidth which is feedback output from the capacity assignment control means; and an available bandwidth arithmetic unit for admitting the requested call to be connected if the availblzle bandwidth is determined to be larger than the peak cell rate (PCR) of the call by the comparator and for computing a new available bandwidth by deducting the peak cell rate (PCR) from the previous available bandwidth after the requested call is connected.

3. The high speed connection admission controller based on traffic monitoring according to claim 1, wherein the server means comprises a cell counter register for counting a number of asynchronous transfer mode (ATM) cells and a cell error counter register for counting a number of erroneous asynchronous transfer mode (ATM) cells.

4. The high speed connection admission controller based on traffic monitoring according to claim 1, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent bandwidth and a physical bandwidth to feedback output it to an available bandwidth arithmetic unit in the connection admission control (CAC) means.

5. A high speed connection admission controller based on traffic monitoring comprising:

first to m sub-connection admission control (CAC) means for determining whether or not to connect of a new call after comparing a peak cell rate (PCR) of the call with a previous available bandwidth when the new call of a heterogeneous traffic is requested to be connected and for computing a new available bandwidth when the new call is admitted to be connected;

first to m buffer means for storing asynchronous transfer mode (ATM) cells which are introduced via the first to m sub-connection admission control (CAC) means by a certain time period when the new call is admitted to be connected;

switching means for selecting asynchronous transfer mode (ATM) cells stored in the first to m buffer means according to Round Robin system to output them;

server means for computing a monitoring value for an asynchronous transfer mode (ATM) cell traffic corresponding to respective classes which are selected by the switching means; and capacity assignment control means for computing a cell probability distribution function per cells from the traffic monitoring values which are output from the server means, for computing equivalent bandwidths for each class according to the probability distribution functions and computing a real available bandwidth from a difference between the equivalent bandwidth and a physical link bandwidth to feedback output the first to m sub-connection admission control (CAC) means.

6. The high speed connection admission controller based on traffic monitoring according to claim 5, wherein the first to m sub-connection admission control (CAC) means comprises:

a comparator for comparing the peak cell rate (PCR) of the call which is requested to be connected with a size of the available bandwidth which is feedback output from the capacity assignment control means; and an available bandwidth arithmetic unit for admitting the requested call to be connected if the available bandwidth is determined to be larger than the peak cell rate (PCR) of the call by the comparator and for computing a new available bandwidth by deducting a peak cell rate from the previous available bandwidth after the requested call is connected.

7. The high speed connection admission controller based on traffic monitoring according to claim 5, wherein the server means comprises a cell counter register for counting number of asynchronous transfer mode (ATM) cells and a cell error counter register for counting number of erroneous asynchronous transfer mode (ATM) cells.

8. The high speed connection admission controller based on traffic monitoring according to claim 5, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band width and a physical bandwidth to feedback output it to an available bandwidth arithmetic unit in the first to m sub-connection admission control (CAC) means.

9. A method for high speed connection admission control based on traffic monitoring comprising the steps of:

comparing a peak cell rate of a call of a homogeneous traffic which is requested to be connected with a previous real available bandwidth which is updated;

admitting connection of the requested call when the available bandwidth is larger than the peak cell rate (PCR) of the call, while rejecting the connection of the call when the available bandwidth is not larger than the peak cell rate (PCR) of the call;

computing a new available bandwidth by deducting the peak cell rate (PCR) of the call from the previous available bandwidth, and storing asynchronous transfer mode (ATM) cells which are introduced, when the call is admitted to be connected;

computing from the stored asynchronous transfer mode (ATM) cells a monitoring value for a traffic of the admitted call as it is connected by a certain time period;

computing a probability distribution function for a cell number from the traffic monitoring value;

computing an equivalent bandwidth according to the probability distribution function; and computing a real available bandwidth from a difference between the equivalent bandwidth and a physical link band width and updating the available bandwidth.

10. A method for high speed connection admission control based on traffic monitoring comprising the steps of:

comparing a peak cell rate of a call, which has the peak cell rate at a random traffic of heterogeneous classes and is requested to be connected, with a previous real available bandwidth which is updated;

admitting connection of the requested call when the available bandwidth is larger than the peak cell rate (PCR) of the call, while rejecting the connection of the call when the available bandwidth is not larger than the peak cell rate (PCR) of the call;

computing a new available bandwidth by deducting the peak cell rate (PCR) of the call from the previous available bandwidth, and storing asynchronous transfer mode (ATM) cells which are introduced, when the call is admitted to be connected;

selecting the stored asynchronous transfer mode (ATM) cells and computing a monitoring value for a traffic of the admitted call per classes by a certain time period, as the call is connected;

computing a probability distribution function for a cell number from the traffic monitoring value;

computing an equivalent bandwidth according to the probability distribution function; and computing a real available bandwidth from a difference between the equivalent bandwidth and a physical link band width and updating the available bandwidth.

11. The method for high speed connection admission control based on traffic monitoring according to claim 10, wherein the step for computing an equivalent bandwidth according to the probability distribution function comprises of the steps of:

assigning a highest value and a lowest value of an equivalent bandwidth by inputting parameters for computing the equivalent bandwidth for a random traffic in case that an estimated value for a cell probability distribution function is given;

computing a middle value between the highest value and the lowest value to set it as the equivalent bandwidth and for computing a cell loss rate for a traffic of a random class in a corresponding renewal period of the set equivalent bandwidth;

comparing the cell loss rate with a service demand threshold value to output the equivalent bandwidth if they are equal or to re-compute the cell loss rate by adding next cell if they are not equal;

comparing the recomputed cell loss rate with the service demand threshold value to assign a current equivalent bandwidth to the lowest value if the cell loss rate is larger than the service demand threshold value, or assign the current equivalent bandwidth to the highest value if the cell loss rate is smaller than the service demand; and outputting the highest value as the equivalent bandwidth if the counted cell number is larger than the assigned value.

12. The high speed connection admission controller based on traffic monitoring according to claim 2, wherein the server means comprises a cell counter register for counting a number of asynchronous transfer mode (ATM) cells and a cell error counter register for counting a number of erroneous asynchronous transfer mode (ATM) cells.

13. The high speed connection admission controller based on traffic monitoring according to claim 12, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band width and a physical bandwidth to feedback output it to an available bandwidth arithmetic unit in the connection admission control (CAC)means.

14. The high speed connection admission controller based on traffic monitoring according to claim 2, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band width and a physical bandwidth to feedback output it to an available bandwidth arithmetic unit in the connection admission control (CAC)means.

15. The high speed connection admission controller based on traffic monitoring according to claim 6, wherein the server means comprises a cell counter register for counting number of asynchronous transfer mode (ATM) cells and a cell error counter register for counting number of erroneous asynchronous transfer mode (ATM) cells.

16. The high speed connection admission controller based on traffic monitoring according to claim 15, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band,-width and a physical bandwidth to feedback output it to an available bandwidth arithmetic unit in the first to m sub-connection admission control (CAC) means.

17. The high speed connection admission controller based on traffic monitoring according to claim 7, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band,-width and a physical bandwidth to feedback output it to an available bandwidth arithmetic unit in the first to m sub-connection admission control (CAC) means.

18. The high speed connection admission controller based on traffic monitoring according to claim 6, wherein the capacity assignment control means comprises:

a cell rate distribution decision part for computing a probability distribution function for a cell number from the traffic monitoring value output from the server means; and a used available bandwidth decision part for computing an equivalent bandwidth according to the probability distribution function obtained by the cell rate distribution decision part, and computing a real available bandwidth from a difference between the equivalent band,-width and a physical bandwidth to feedback output it to an available bandwidth arithmetic unit in the first to m sub-connection admission control (CAC) means.

\* \* \* \* \*